(12) United States Patent
Wengrovitz et al.

(10) Patent No.: US 6,754,314 B2
(45) Date of Patent: Jun. 22, 2004

(54) DIGITAL TEXT MESSAGING SYSTEM AND METHOD

(75) Inventors: Michael Wengrovitz, Concord, MA (US); Andrew Nelson, Lynnfield, MA (US)

(73) Assignee: Alcatel, Paris (FR)

( * ) Notice: Subject to any disclaimer, the term of this patent is extended or adjusted under 35 U.S.C. 154(b) by 53 days.

(21) Appl. No.: 10/264,061

(22) Filed: Oct. 2, 2002

(65) Prior Publication Data

US 2003/0072422 A1 Apr. 17, 2003

Related U.S. Application Data

(60) Provisional application No. 60/329,166, filed on Oct. 12, 2001.

(51) Int. Cl.[7] .............................................. H04M 11/00
(52) U.S. Cl. .................... 379/93.01; 340/7.29; 340/7.31
(58) Field of Search ................. 379/93.01, 93.05–93.07, 379/93.18, 93.17, 93.27; 340/3.5, 3.54, 7.29, 7.1–7.21, 7.24, 7.25, 7.31, 539.1, 539.11

(56) References Cited

U.S. PATENT DOCUMENTS

| | | | |
|---|---|---|---|
| 5,561,703 A | 10/1996 | Arledge et al. | |
| 5,581,593 A | 12/1996 | Engelke et al. | |
| 5,809,425 A | 9/1998 | Colwell et al. | |
| 5,964,833 A | 10/1999 | Kikinis | |
| 6,005,928 A | 12/1999 | Johnson | |
| 6,118,856 A | 9/2000 | Paarsmarkt et al. | |
| 6,137,867 A | * 10/2000 | Perera et al. ............ | 379/93.18 |

FOREIGN PATENT DOCUMENTS

| | | |
|---|---|---|
| WO | WO 96/21315 | 7/1996 |
| WO | WO 96.41461 | 12/1996 |

OTHER PUBLICATIONS

Motorola Web Site, Motorola Wordsender, http://www.motorola.com/MIMS/MSPG/Press/PR19950106_9.html, printed Mar. 4, 2003.

Motorola Web Site, FLEX™ Technology Overview, http://www.motorola.com/MIMS/MSPG/FLEX/overview/overview.html, printed on Mar. 4, 2003.

* cited by examiner

*Primary Examiner*—Wing Fu Chan
(74) *Attorney, Agent, or Firm*—Michael Blaine Brooks, P.C.; Michael Blaine Brooks; David A. Cordeiro

(57) ABSTRACT

A communication system is disclosed including a first digital telephone set, a second digital telephone set, or its processing equivalent, having a private branch exchange (PBX)-paging server interface, and a PBX operative between the first digital telephone set and the second digital telephone set, wherein the second digital telephone set transmits text messages received from the first digital telephone set to a paging server via the PBX-paging server interface and wherein the paging server transmits the text messages to a pager. Also disclosed is a communication method including the steps of keying-in a text message on a first digital telephone set, transmitting the text message, via a private branch exchange (PBX), from the first digital telephone set to a second digital telephone set having a PBX-paging server interface, transmitting the text message, via the PBX-paging server interface, from the second digital telephone set to a paging server, transmitting the text message from the paging server to a pager, and displaying the text message on the pager.

55 Claims, 6 Drawing Sheets

DIGITAL TEXT MESSAGING SYSTEM AND METHOD

CROSS REFERENCE TO RELATED APPLICATIONS

This application claims priority from the following U.S. Provisional Patent Application, the disclosure of which, including all appendices and all attached documents, is incorporated by reference in its entirety for all purposes: U.S. Provisional Patent Application Ser. No. 60/329,166, of Michael S. Wengrovitz and Andrew Nelson entitled, NOVEL USAGE OF DIGITAL TELEPHONE SET KEYBOARD/DISPLAY FOR GENERATING TEXT MESSAGES TO ALPHANUMERIC PAGERS, CELLPHONES AND PDAs," filed Oct. 12, 2001.

FIELD OF THE INVENTION

This invention relates to a communication system and method for providing messages and notifications to a user via a telephone set enabled with an alphanumeric keypad. More particularly, this invention relates to a communication system, and method for using same, that incorporate a telephone set enabled with an alphanumeric keypad and display, a private branch exchange (PBX) and a paging server integrated therewith for permitting a recipient to receive via an appliance enabled to receive alphanumeric messages.

BACKGROUND

Paging is an important element of enterprise communication systems. Many enterprises routinely distribute electronic pagers to their employees and catalog the corresponding pager IDs within the corporate directory database.

Pagers often have multi-line, scrollable, backlit displays that present alphanumeric characters, including a callback number, time and date information, and brief text messages. Some cellular telephones receive text pages if the appropriate service is enabled, and various personal digital assistants (PDAs) also receive pages if they are equipped with the appropriate reception hardware and service.

National, regional, and premise-based paging systems accept input via protocols such as Telocator Alphanumeric Protocol (TAP), enhanced TAP, Simple Network Paging Protocol (SNPP), and Wireless Communication Transfer Protocol (WCTP).

Protocols such as SNPP and WCTP support two-way pager operation.

In one presently common paging method, the calling user dials the telephone number of a particular pager, and inputs a callback number by depressing the appropriate combination of touchtone (Dual-Tone Multi-Frequency) keys. After the calling user confirms that the callback number has been correctly entered, the corresponding numeric message is sent to the pager. Due to limitations in present systems, typically only numeric information is sent when the above method is used.

In a second method, the calling user dials the pager number and is then forwarded, typically via an Interactive Voice Response (IVR), to a human operator who also functions as a transcriber by first listening to the caller's message and then typing the message into a system. The resultant transcribed message is then sent as a text message to the paged recipient. Although this method provides for both numeric and text messages, it requires that a human operator be present to correctly transcribe each message.

In a third method, the calling user who wishes to send a text message uses a dedicated text entry terminal as an input device to enter the text message along with the desired pager number. Enterprise workers who send many pages to multiple recipients on a daily basis typically use this method. The method can be highly inconvenient since a limited number of text entry terminals in centralized locations must be shared by multiple users.

In a fourth method, the calling user enters a text message into a personal computer (PC) via a keyboard and, in turn, the computer, through its digital processing and input/output devices, transmits the message to the pager. The software applications executable on the PC for this method of keyboard entry includes: a standard e-mail client; an instant-messaging application; a dedicated software application; or a web-based client within a client-server application. Efficient practice of this fourth method requires that the calling user have access to a PC and be familiar with the operation of the specific dedicated software application. Also, since standard desktop PCs are known to be less than completely reliable, particularly when contrasted with telephone sets, a PC used in this method may crash, lock-up, or otherwise fail to execute. As such, this method of data entry has questionable applicability in life-critical paging applications such as those in hospitals and healthcare delivery systems.

At present, the keypads and displays on PBX digital telephone sets are not used for creating and sending text to external pagers, Personal Digital Appliances (PDAs), cellular telephones and the like. Usage of the PBX telephone set keyboard and display has a number of advantages over existing methods for creating and sending text to pagers. Specifically, both numeric and text-based messages can be sent, and there is no need for a human operator to transcribe text messages. Further, usage of the PBX telephone set eliminates the need for the user to share access to a limited number of centralized text entry terminals, since each user can access his personal telephone set for message composition. Finally, the reliability and ease-of-use of PBX telephone sets can be exploited, as compared to desktop PC software applications which can crash or lock-up.

SUMMARY

The several embodiments of the present invention provide text messaging to pagers and other electronic devices, the communications being initiated at a digital telephone set with a keyboard, and without both human message transcription and modifications to existing PBX telephone systems to which the initiating digital telephone set is in communication. The communication system embodiments of the present invention have a first digital telephone set, a second digital telephone set, or its processing equivalent, having a private branch exchange (PBX)-paging server interface, and a PBX operative between the first digital telephone set and the second digital telephone set, wherein the second digital telephone set transmits text messages received from the first digital telephone set to a paging server via the PBX-paging server interface and wherein the paging server transmits the text messages to a pager. The communication method embodiments of the present invention have the steps of keying-in a text message on a first digital telephone set, transmitting the text message, via a private branch exchange (PBX), from the first digital telephone set to a second digital telephone set having a PBX-paging server interface, transmitting the text message, via the PBX-paging server interface, from the second digital telephone set to a paging server, transmitting the text message from the paging server to a pager, and displaying the text message on the pager.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
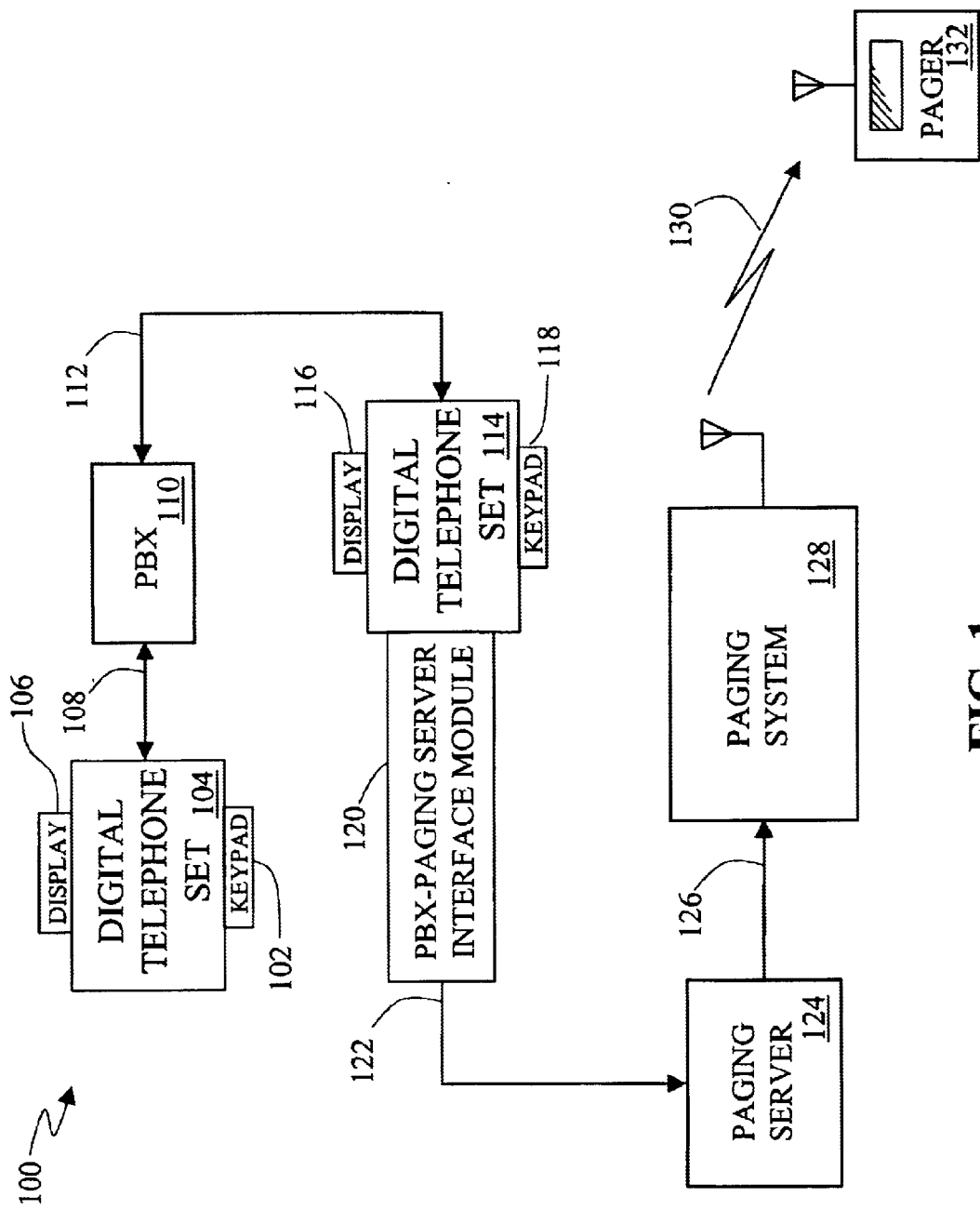
FIG. 1 is a system block diagram of an embodiment of the present invention where one-way paging is performed.

A method and system for the entering of page information by enterprise workers is provided in the following several embodiments of the present invention. The system architecture 100 for one embodiment using telephone set keypads and displays to create and send messages to destination pagers, paging devices, cellphones and PDAs is depicted in FIG. 1. In this embodiment, the user preferably creates a text message by using the keyboard 102 of a digital telephone set 104.

The telephone keyboards 102 of the several embodiments of the present invention preferably have the built-in QWERTY keyboard 102 and displays 106 already incorporated within some PBX 110 digital telephone sets 104 found on the desktops of enterprise workers. Several digital telephone sets 104, including the Alcatel® 4035™ and 4020™, for example, incorporate a built-in QWERTY keypad 102 and a multi-line LCD display 106. However, the keypad 102 and display 106 are not presently used or enabled for sending messages to external paging systems 128. Rather, the keypad 102 is presently used to perform dial-by-name, and the display 106 is presently used to provide other auxiliary information to the caller, such as call progression state, caller identification (ID), voicemail parameters, and prompting information. In an exemplary Alcatel® system, the keypad 102 and display 106 are also presently enabled and used to perform text messaging from one telephone set to another telephone set. In this mode, the user preferably composes a text message on the keyboard 102. When the message is fully composed, the user sends this message from his digital set 104 to another digital set, and not to an external pager device 132.

In the several embodiments of the present invention, the message being composed is displayed character-by-character on the display 106 of the digital telephone set 104. By viewing the display 106 and using the editing keys of the keyboard 102, the calling user can make appropriate modifications, additions, and deletions to the message prior to committing to transmission. The user may also enter the pager destination ID within the text message. Preferably when the user is satisfied with the message content, a "send" button on the telephone set 104 is depressed and the message is sent through the PBX 110 to a destination telephone set 114. The destination set preferably is a standard digital telephone set 114 with a keyboard 118 and display 116. The destination telephone set 114 exposes digital information it receives through use of a PBX-Paging Server Interface Module 120.

In the system embodiment of the present invention, the digital information preferably is forwarded 122 by the PBX-Paging Server Interface Module 120 from the destination telephone set 114 to a Paging Server 124. The Paging Server 124 preferably decodes the digital information, extracts the ID of the destination pager 132, and reformats the message within the protocol expected by the paging system 128 and sends this message 126 to the paging system 128. The paging system preferably then transmits the message 128 to the destination pager 132.

The PBX 110 preferably views the message transmission 108 as a standard text message sent from one digital telephone 104 set to another 114. To achieve the new functionality without changing the existing PBX hardware, software or operating system, this embodiment uses the destination set 114 to expose its received digital data 112 via a special interface module, which is referred to as a PBX-Paging Server Interface Module 120. The PBX-Paging Server Interface Module 120 preferably exposes the two-way digital signaling into and out-of the destination set 114. This digital data preferably is then sent 122 on to the Paging Server 124, the Paging System 128, and the pager 132.

The PBX-Paging Server Interface Module 120 preferably is hardware that inserts directly into a digital phone, also termed "plugware," and is drawn preferably from electrical and electronic circuitry supportive of first party computer-telephony integration (CTI) and the Microsoft® Windows® Telephony Application Program Interface (TAPI) applications. First party CTI applications typically include PC-based dialing for outbound telephone calls, and PC-based screen display of caller-ID for inbound telephone calls. The input, output and processing specifications for first party CTI hardware typically allow the PC screen and keyboard to be utilized in addition to the telephone display and pushbutton set. First party CTI hardware modules typically have a serial port that is connected to a PC.

Embodiments of the present invention include those that have a PBX 110 storing a series of fixed messages and/or message phrases; stored selected messages provided to assist the user in composing each message. For example, several types of emergency messages, as well as several types of standard messages, are pre-constructed. As a result, the user may select from these pre-constructed messages to simplify message composition.

Embodiments of the present invention include using groups of standard destinations that are predefined by the system and/or the user. For example, the message is directed by the calling user to be sent to "group1," "group2," or the like, separately or in combinations via keystroke codes. So that the members of such identified groups are defined with the Paging Server 124 in these several embodiments, the Paging Server 124 is enabled to work in collaboration with the PBX 110. That is, multiple group recipients and message formats are identified by tag information known to both the PBX 110 and the Paging Server 124. For example, if the user composed or selected the message of "Group ID2: Emergency Code 126", the Paging Server 124 next interprets the "Group ID2" message portion as a tag, or keystroke code, to identity the group of 17 intended recipients to which the message would then be sent. Expanding the example, the Paging Server 124, interprets the "Emergency Code 126" message, or keystroke codes, portion so that corresponding text message "Code Blue, Floor 1, Ward 2, Room 6" would be composed and sent.

In several embodiments of the present invention, the Paging Server 124 modifies the message by appending attributes from a list including the caller ID, time, date, priority, or by otherwise reformatting the message. Further, the Paging Server 124 is configurable to schedule the delivery of the message at a later time.

Figure 2:
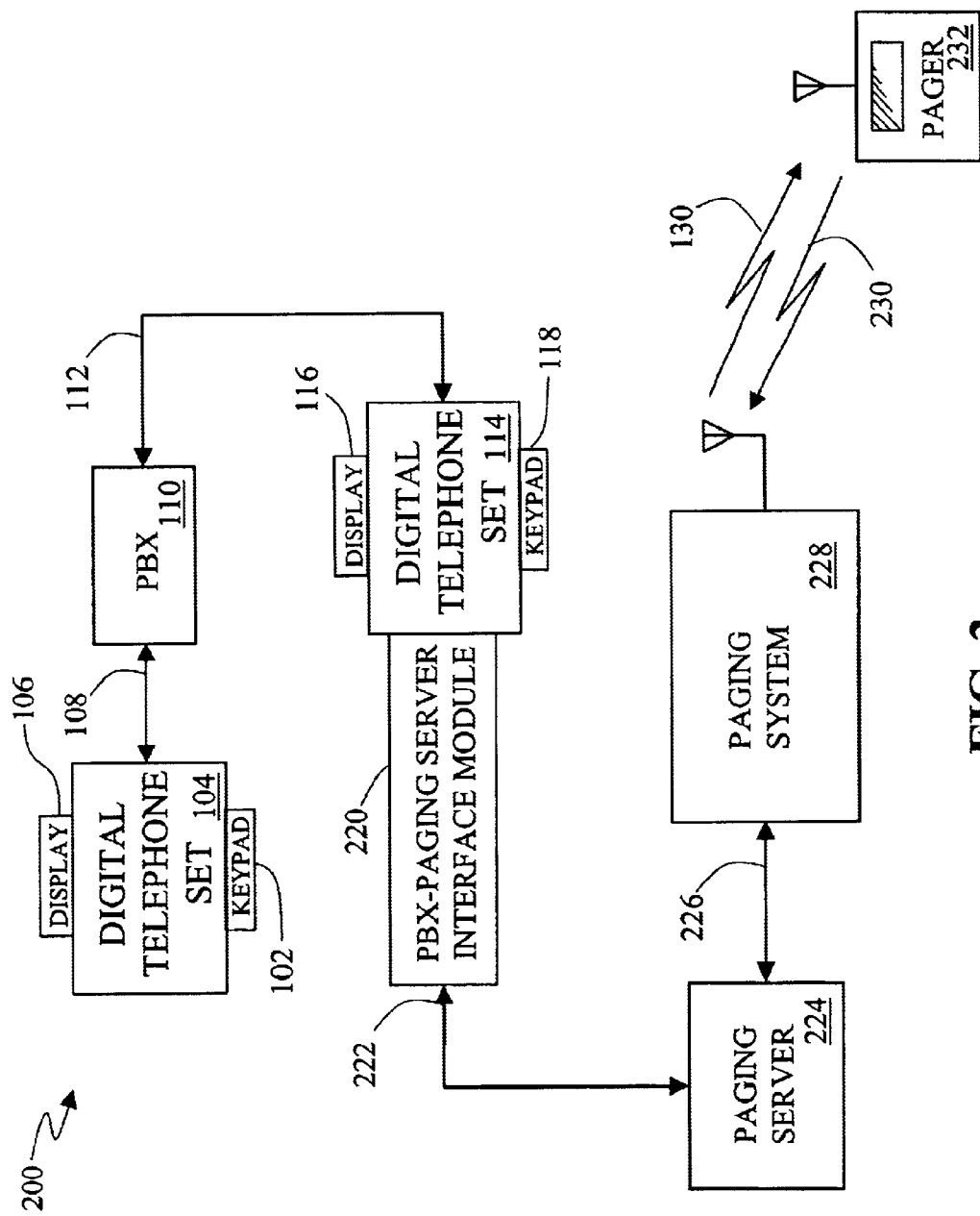
FIG. 2 is a system block diagram of an embodiment of the present invention where two-way paging is performed.

Alternative embodiments of the present invention have communication channels of the system 200 operating in a two-way mode as illustrated in FIG. 2. In these embodiments, the acknowledgment or selection from the pager 232 travels backwards through the system 200 to the originating set 104. For example, pager 232 is enabled to receive a text message 130 and transmit a message 230, paging system 228 is enabled to send to and receive from the pager and is enabled to receive from and send to 226 the paging server 224, PBX-Paging Service Interface Module 220 is enabled to send to and receive from the paging server 224. The message or acknowledgment sent from the pager set would then be presented on the display of 106 of telephone set 104.

In an alternative embodiment of the present invention, the system delivers text messages to pagers, telephone sets or combinations of both. Thus, when a message is sent to "group1" comprised of paging units and telephone sets, the PBX delivers this message to telephone sets within "group1," of which one of the sets is the receiving telephone set 114. The Paging Server 228 then delivers the message that has arrived at the receiving telephone set 114 to all paging units 232 within group1 according to its group membership definition.

Figure 3:
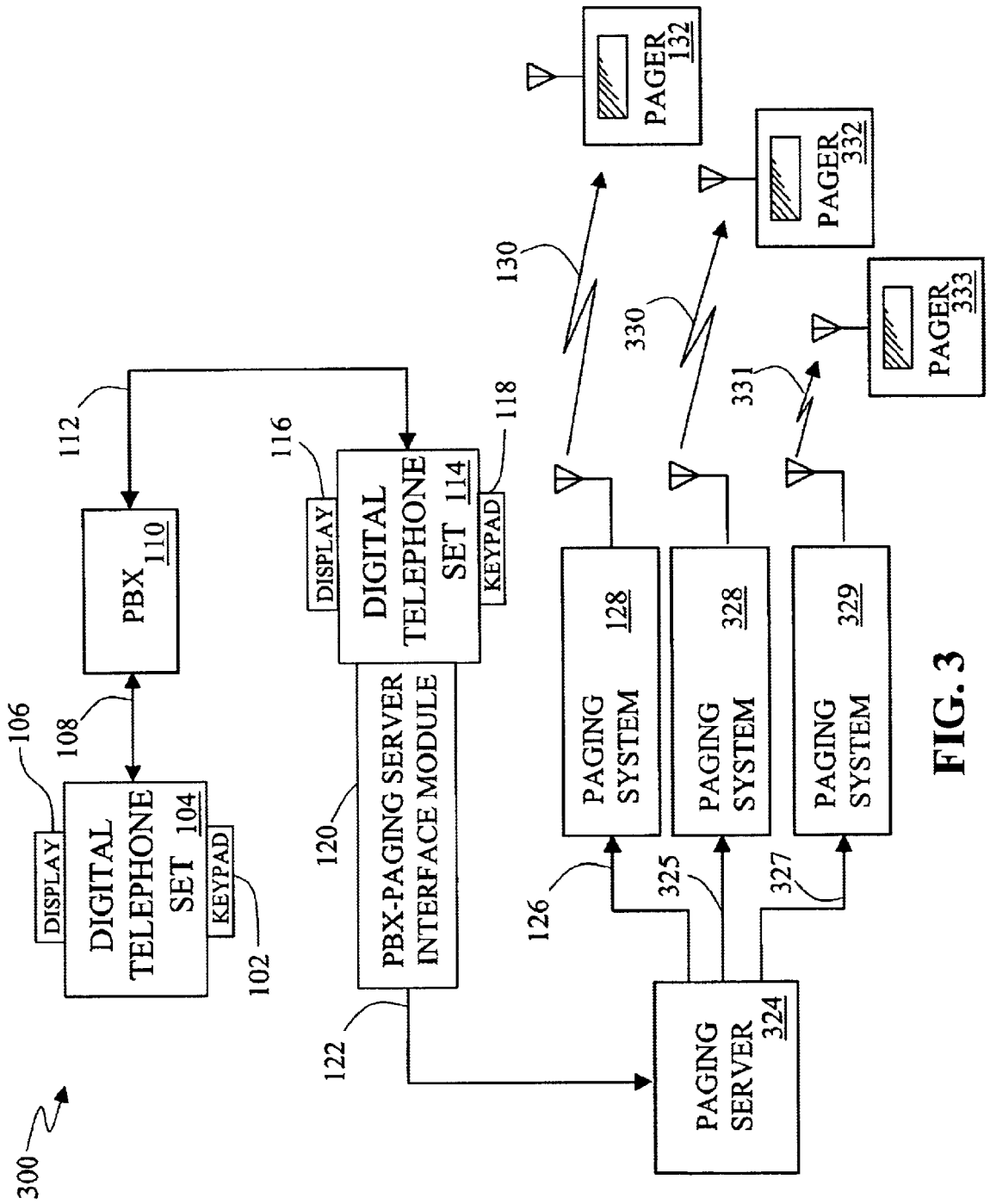
FIG. 3 is a system block diagram of an embodiment of the present invention where multiple paging systems are used.

In an alternative embodiment illustrated in FIG. 3, the Paging Server 324 is enabled as a paging protocol converter whereby each message generated by the digital telephone set is translated by the Paging Server 324 according to the one or more paging systems (e.g., 128, 328, 329) of its one or more destination pagers (e.g., 132, 332, 333) via protocol appropriate transmissions (e.g., 130, 330, 331). A Paging Server 324 of this embodiment translates between the message intended for the digital set and the protocol required by the one or more of paging systems (e.g., 128, 328, 329) to which it interfaces. The embodiment disclosed herein is scalable to accommodate a plurality of concurrent paging system protocols and translations by the paging server thereof. The protocols of the various paging systems accommodated by the embodiment disclosed include, but are not limited to, TAP, extended TAP, SNPP, WCTP and/or Simple Mail Transfer Protocol (SMTP). Table look-up procedures are used in the protocol conversion so that, for example, if "interface 128" is an extended TAP system, the Paging Server 324 uses a look-up procedure to determine the command syntax in a table for extended TAP so as to reformat the message. The paging protocol converting embodiments extend from "plugware" embodiments presently disclosed to the emulated interface embodiments disclosed below.

Figure 4:
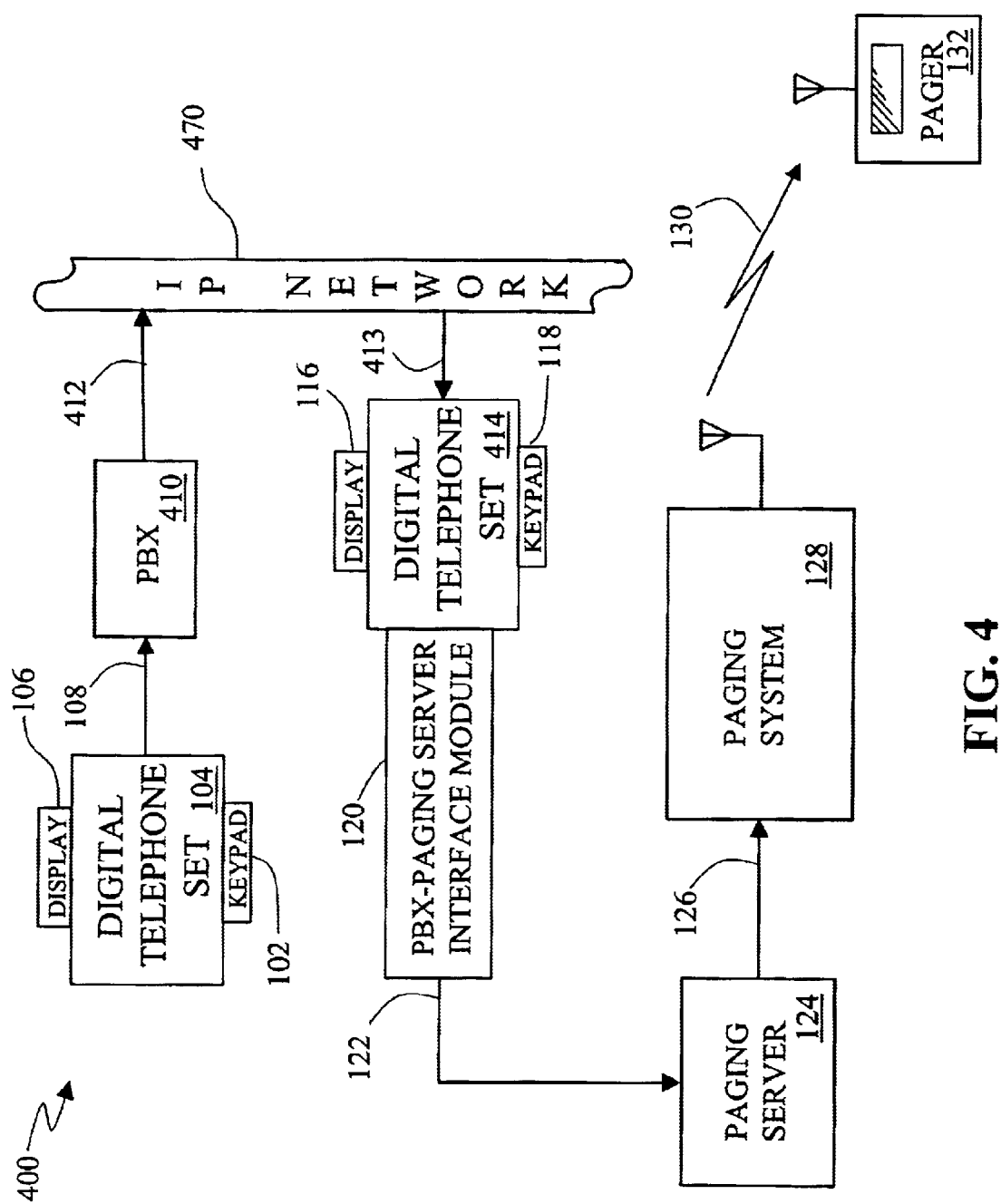
FIG. 4 is a system block diagram of an embodiment of the present invention where a network connection between the PBX and the paging system interface is used.

In an alternative embodiment illustrated in FIG. 4, the system 400 has PBX 410 that delivers 412 the text message to a digital telephone 414 enabled to receive telephonic communications 413 according to Internet Protocol (IP) via the IP-enabled network (IP Network) 470. This IP telephone set 414 is further enabled by a PBX-Paging Server Interface Module 120.

Figure 5:
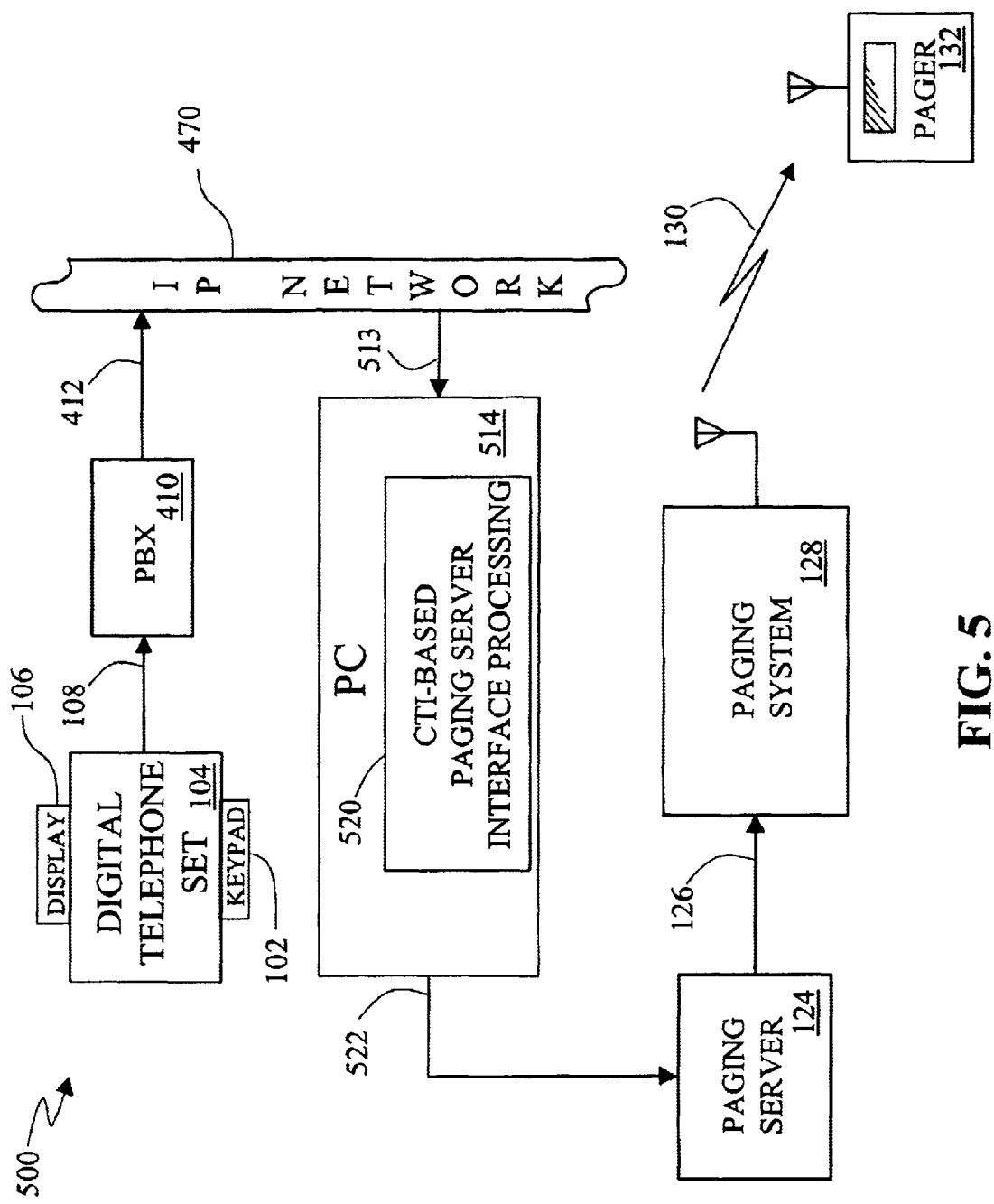
FIG. 5 is a system block diagram of an embodiment involving a PC-based integration between the PC and the paging server.
Figure 6:
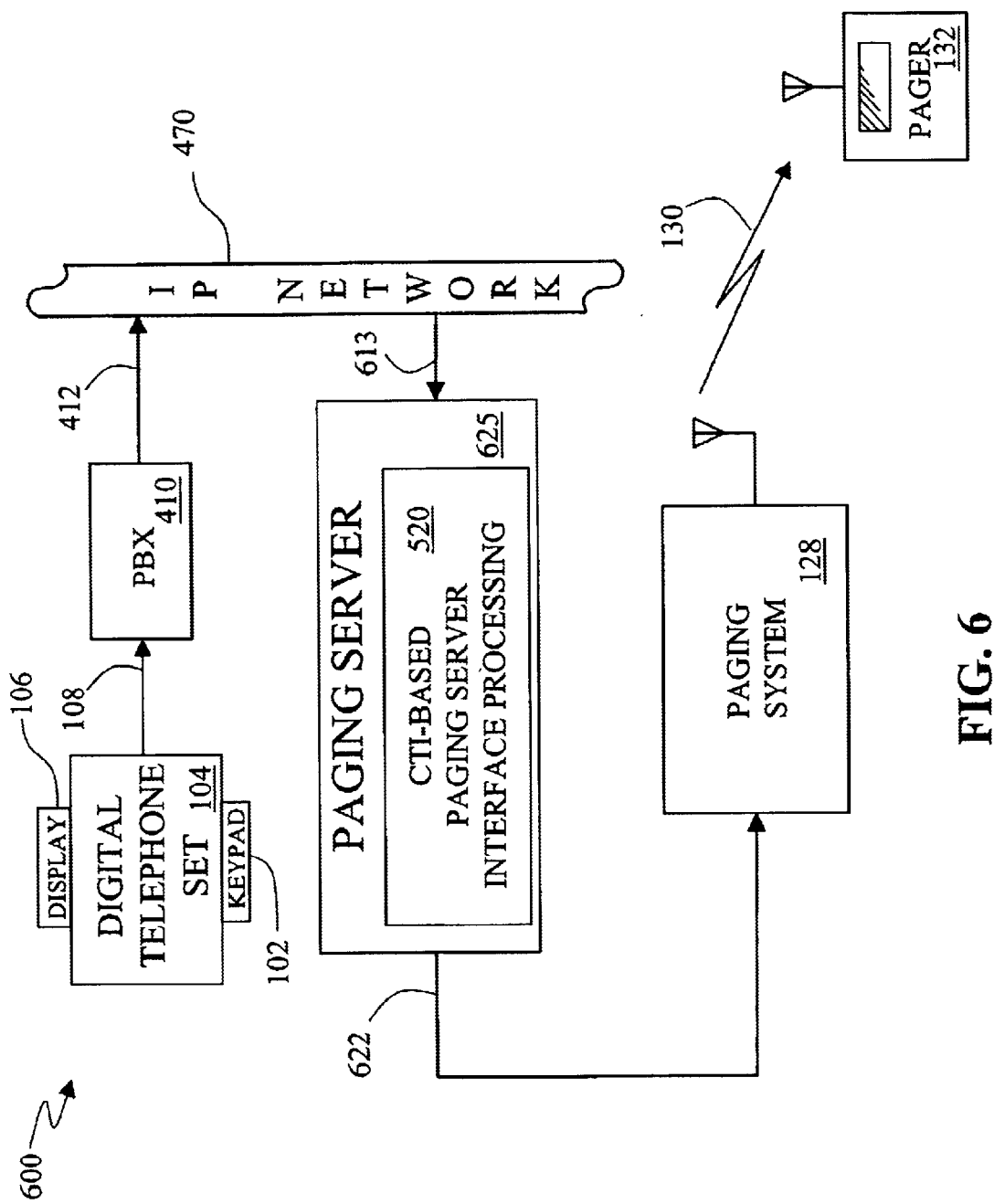
FIG. 6 is a system block diagram of an embodiment of the present invention where the paging system interface and paging server are combined within the same appliance.

While shown as separate elements in the foregoing figures (FIGS. 1–3), the interface, server and paging functions are executed as variously incorporated elements as disclosed in alternative embodiments below. In an alternative embodiment illustrated in FIG. 5, the receiving hardware, described in FIG. 4 as consisting of a digital telephone set 414 plus a PBX-Paging-Server Interface Module 120, is replaced by the PBX-paging server interface processing 520 preferably executed by a hosting computer 514. The processing 520 is preferably based on computer-telephony integration (CTI) and the Microsoft® Windows® Telephony Application Program Interface (TAPI) causes the host computer 514 to receive digital messages 513 from the PBX 410 via the network 470 and transmits the messages 522 to the Paging Server 124, executing telephone-to-server text message translations as necessary.

In this embodiment, by using its CTI-based paging server interface processing 520, the PC 514 emulates the operation of the digital phone set 414 over the network so that a separate telephone set 414 is not required. The host computer 514 is a general processing computer and in alternative embodiments is a specialized processor and as disclosed in the embodiments of FIGS. 1 and 2, the communication paths are also alternatively embodied with bi-directionality.

An alternative embodiment has the Paging Server 625 hosting the the PBX-paging server interface processing or otherwise executes steps based on computer-telephony integration 520. This processing 520 preferably causes the Paging Server 625 to receive digital messages 613 from the PBX 410 via the IP Network 470 and transmits the messages 622 to the Paging System 128. As disclosed in the embodiments of FIGS. 1 and 2, the communication paths are also alternatively embodied with bi-directionality. Other alternative embodiments have a Paging Server enabled with transmissive capacity and, in some embodiments also with receptive capacity, so that the Paging Server subsumes, or otherwise wholly incorporates the functionality of a Paging System by being in direct communication with pagers of the communication system.

In the several embodiments of the present invention, the method of use includes: typing, editing, and composition of the message and pager destination ID via usage of the keyboard and display of a digital telephone set; transmitting the message via a PBX to a destination digital telephone set augmented by a PBX-paging server interface module or a digital signal processing equivalent thereof; receiving the message by the destination digital telephone set; transmitting the message by the destination telephone set to a paging server; and transmitting the message by the paging server to the destination pager. The transmission by the paging server to the pager, in alternative embodiments, includes the step of the paging system transmitting to the pager via the paging system. Additional steps of alternative embodiments include transmitting by the destination pager of a text messaging to the paging system, with the above steps are repeated in reverse order to provide the text message to the originating digital telephone set. Additional steps of alternative embodiments include translating by the paging server the text message into a plurality of paging system protocols and transmitting by the paging server to the plurality of paging systems, and receiving and transmitting the translated text message by each of the paging systems to pagers. Additional steps of alternative embodiments include entering of keystroke codes into the digital telephone set thereby causing the paging server to: use preselected messages from a look-up table or conduct group transmissions, or both. In addition, the paging server in alternative embodiments has an additional step of appending message attributes to the message prior to transmission.

Many alterations and modifications may be made by those having ordinary skill in the art without departing from the spirit and scope of the invention. For example, enhancements in paging protocols and entirely new paging protocols could be accommodated throughout the several embodiments of the invention without deviating from the spirit and scope of the invention. Therefore, it must be understood that the illustrated embodiments have been set forth only for the purposes of example and that it should not be taken as limiting the invention as defined by the following claims.

The words used in this specification to describe the several embodiments of the present invention are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself. For example, keyboards and keypads include alternative English language alphanumeric keyboards including Dvorak and alphabetical arrangements as well as alphabetical and character-based keyboards for languages other than English. Likewise, a pager or paging device includes all wireless appliances and electronic devices enabled to receive text messages according to an established paging protocol and in alternative embodiments a pager or paging device includes all wireless appliances and electronic devices enabled to receive and transmit text messages according to an established paging protocol.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include that which is specifically illustrated and described above; that which is conceptually equivalent, that which can be obviously substituted and that which incorporates the essential idea of the invention as disclosed by its several embodiments.

We claim:

1. A communication system, comprising:
a first digital telephone set;
a second digital telephone set having a private branch exchange (PBX)-paging server interface; and
a PBX operative between the first digital telephone set and the second digital telephone set;
wherein the second digital telephone set transmits text messages received from the first digital telephone set to a paging server via the PBX-paging server interface and wherein the paging server transmits the text messages to a pager.

2. The communication system of claim 1, wherein the paging server transmits the text message to the pager via a paging system.

3. The communication system of claim 1, wherein the PBX-paging server interface is an electronics module having circuitry supportive of a computer-telephony integration application.

4. The communication system of claim 1, wherein the paging server translates and transmits the text message according to at least one paging protocol.

5. The communication system of claim 1, wherein the paging server translates and transmits the text message according to at least one paging protocol selected from the group consisting of Telocator Alphanumeric Protocol, enhanced Telocator Alphanumeric Protocol, Simple Network Paging Protocol, Wireless Communication Transfer Protocol, and Simple Mail Transfer Protocol.

6. The communication system of claim 1, wherein the paging server transmits text messages received from the pager to the second digital telephone set via the PBX-paging server interface and wherein the second digital telephone set transmits text messages to the first digital phone set via the PBX.

7. The communication system of claim 1 wherein one or more keystroke codes entered into the first digital telephone set and received by the paging server are adapted as group transmissions.

8. The communication system of claim 1 wherein one or more keystroke codes transmitted to the PBX by the first digital telephone set are adapted to support preselected messages from a look-up table.

9. The communication system of claim 1 wherein one or more keystroke codes transmitted to the PBX by the first digital telephone set are interpreted by the paging server as preselected messages from a look-up table.

10. The communication system of claim 1 wherein the paging server modifies the text message by appending message attributes.

11. The communication system of claim 1 further comprising an Internet Protocol-based network operative between the PBX and the second digital telephone set.

12. The communication system of claim 1, wherein the PBX-paging server interface receives text messages from the PBX via an Internet Protocol-based network and for transmitting the text message to the paging server.

13. The communication system of claim 1, wherein the PBX-paging server interface executes steps based on computer-telephony integration.

14. The communication system of claim 1 wherein the pager comprises a visual display providing visual signals for displaying a message received from the paging server transmission.

15. The communication system of claim 1 wherein the first digital telephone set comprises a keypad and visual display.

16. A communication system, comprising:
a digital telephone set;
a digital telephonic signal processing element having a private branch exchange (PBX)-paging server interface; and
a PBX operative between the digital telephone set and the processing element;
wherein the processing element conveys a text message received from the digital telephone set to a paging server via the PBX-paging server interface and wherein the paging server transmits the text message to a pager.

17. The communication system of claim 16 wherein the paging server transmits the text message to the pager via a paging system.

18. The communication system of claim 16 further comprising an Internet Protocol-enabled network operative between the PBX and the processing element.

19. The communication system of claim 16 wherein the processing element processes text messages received from the pager via the PBX-paging server interface.

20. The communication system of claim 16 wherein the processing element executes steps of computer-telephony integration.

21. The communication system of claim 20 wherein the processing element further executes steps of a telephone-to-server text message translation.

22. The communication system of claim 16 wherein the paging server translates and transmits the text message according to at least one paging protocol.

23. The communication system of claim 16 wherein the paging server translates and transmits the text message according to at least one paging protocol selected from the group consisting of Telocator Alphanumeric Protocol, enhanced Telocator Alphanumeric Protocol, Simple Network Paging Protocol, Wireless Communication Transfer Protocol, and Simple Mail Transfer Protocol.

24. The communication system of claim 16 wherein one or more keystroke codes keyed into the digital telephone set are received by the paging server and adapted as group transmissions.

25. The communication system as claimed in claim 16 wherein one or more keystroke codes transmitted to the PBX by the digital telephone set are adapted to support preselected messages from a look-up table.

26. The communication system of claim 16 wherein one or more keystroke codes transmitted to the PBX by the digital telephone set are interpreted by the paging server as preselected messages from a look-up table.

27. The communication system of claim 16 wherein the paging server modifies the text message by appending message attributes.

28. A communication system, comprising:
a digital telephone set;
a digital telephonic signal processor having a private branch exchange (PBX)-paging server interface; and
a PBX operative between the digital telephone set and the processor;
wherein the processor processes a text message received from the digital telephone set and wherein the processor transmits the text message to a pager via the PBX-paging server interface.

29. The communication system of claim 28 wherein the PBX-paging server interface transmits the text message to the pager via a paging server.

30. The communication system of claim 29, wherein the paging server transmits the text message to the pager via a paging system.

31. The communication system of claim 28 further comprising an Internet Protocol-enabled network operative between the PBX and the processor.

32. The communication system of claim 28 wherein the processor processes a text message received from the pager via the PBX-paging server interface.

33. The communication system of claim 28 wherein the processor executes steps of computer-telephony integration.

34. The communication system of claim 33 wherein the processor further executes steps of telephone-to-server text message translation.

35. The communication system of claim 29 wherein the paging server translates the text message according to at least one paging protocol.

36. The communication system of claim 29 wherein the paging server translates the text message according to at least one paging protocol selected from the group consisting of Telocator Alphanumeric Protocol, enhanced Telocator Alphanumeric Protocol, Simple Network Paging Protocol, Wireless Communication Transfer Protocol, and Simple Mail Transfer Protocol.

37. The communication system as claimed in claim 29 wherein one or more keystroke codes keyed into the digital telephone are received by the paging server and adapted as group transmissions.

38. The communication system of claim 28 wherein one or more keystroke codes transmitted to the PBX by the digital telephone set are adapted to support preselected messages from a look-up table.

39. The communication system of claim 29 wherein one or more keystroke codes transmitted to the PBX by the digital telephone set are interpreted by the paging server as preselected messages from a look-up table.

40. The communication system of claim 29 wherein the paging server modifies the text message by appending attributes.

41. A communication method, comprising the steps of:
keying-in a text message on a first digital telephone set;
transmitting the text message, via a private branch exchange (PBX), from the first digital telephone set to a second digital telephone set having a PBX-paging server interface;
transmitting the text message, via the PBX-paging server interface, from the second digital telephone set to a paging server;
transmitting the text message from the paging server to a pager; and
displaying the text message on the pager.

42. The communication method of claim 41 wherein the step of transmitting the text message from the paging server to the pager comprises the steps of transmitting the text message from the paging server to a paging system and transmitting the text message from the paging system to the pager.

43. The communication method of claim 41 further comprising an additional step preceding the step of transmitting the text message from the paging server to a pager; the additional step comprising the step of adapting, by the paging server, portions of the text message as one or more group transmissions.

44. The communication method of claim 41 further comprising an additional step preceding the step of transmitting the text message from the paging server to a pager; the additional step comprising the step of determining preselected messages from a look-up table, by the paging server, based upon portions of the text message.

45. The communication method of claim 41 further comprising an additional step preceding the step of transmitting the text message from the paging server to a pager; the additional step comprising the step of appending, by the paging server, message attributes to the text message.

46. A communication method, comprising the steps of:
keying-in a text message on a digital telephone set;
transmitting the text message, via a private branch exchange (PBX), from the digital telephone set to a digital telephone set emulation element having a private branch exchange (PBX)-paging server interface associated therewith;
transmitting the text message, via the PBX-paging server interface, from the emulation element to a paging server;
transmitting the text message from the paging server to a pager; and
displaying the text message on the pager.

47. The communication method of claim 46 wherein the step of transmitting the text message from the paging server to the pager comprises the steps of transmitting the text message from the paging server to a paging system and transmitting the text message from the paging system to the pager.

48. The communication method of claim 46 further comprising an additional step preceding the step of transmitting the text message from the paging server to a pager; the additional step comprising the step of adapting, by the paging server, portions of the text message as one or more group transmissions.

49. The communication method of claim 46 further comprising an additional step preceding the step of transmitting the text message from the paging server to a pager; the additional step comprising the step of determining preselected messages from a look-up table, by the paging server, based upon portions of the text message.

50. The communication method of claim 46 further comprising an additional step preceding the step of transmitting the text message from the paging server to a pager; the additional step comprising the step of appending, by the paging server, message attributes to the text message.

51. A communication method, comprising the steps of:
keying-in a text message on a digital telephone set;
transmitting the text message, via a private branch exchange (PBX), from the digital telephone set to a digital telephonic signal processor having a private branch exchange (PBX)-paging server interface;
processing the text message on the processor;
transmitting the text message, via the PBX-paging server interface, to a paging server;
transmitting the text message from the paging server to a pager; and
displaying the text message on the pager.

52. The communication method of claim 51 wherein the step of transmitting the text message from the paging server to the pager comprises the steps of transmitting the text message from the paging server to a paging system and transmitting the text message from the paging system to the pager.

53. The communication method of claim 51 further comprising an additional step preceding the step of transmitting the text message from the paging server to a pager; the additional step comprising the step of adapting, by the paging server, portions of the text message as one or more group transmissions.

54. The communication method of claim 51 further comprising an additional step preceding the step of transmitting the text message from the paging server to a pager; the additional step comprising the step of determining preselected messages from a look-up table, by the paging server, based upon portions of the text message.

55. The communication method of claim 51 further comprising an additional step preceding the step of transmitting the text message from the paging server to a pager; the additional step comprising the step of appending, by the paging server, message attributes to the text message.

* * * * *